Figure 1:
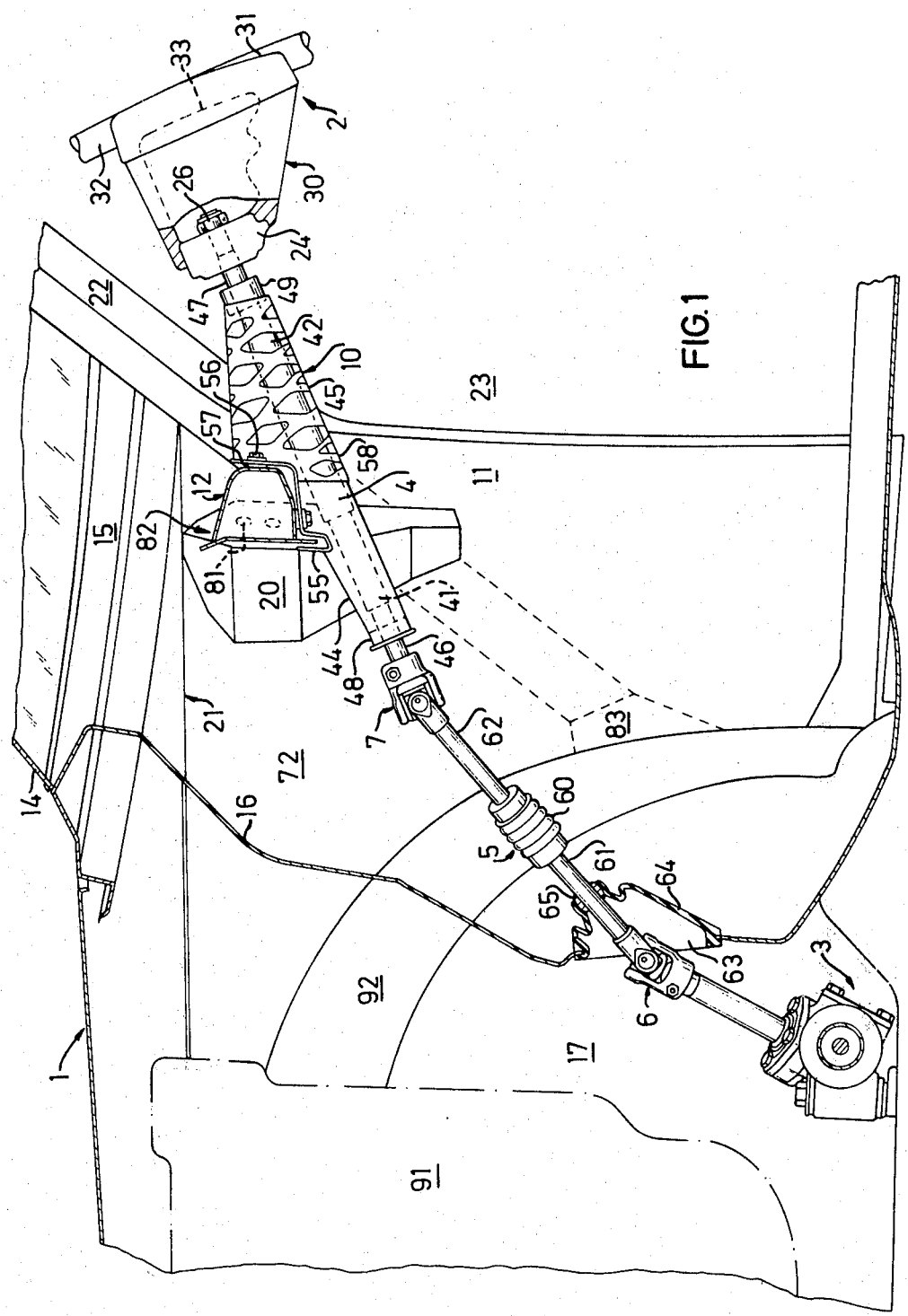

United States Patent [19]

Grahn et al.

[11] 4,297,911
[45] Nov. 3, 1981

[54] STEERING EQUIPMENT ARRANGEMENT FOR MOTOR VEHICLES

[75] Inventors: Sven-Åke Grahn; Magnus A. Roland; Carl L. Eriksson, all of Trollhättan, Sweden

[73] Assignee: Saab-Scania Aktiebolag, Sodertalje, Sweden

[21] Appl. No.: 967,979

[22] Filed: Dec. 11, 1978

[30] Foreign Application Priority Data

Dec. 12, 1977 [SE] Sweden .............................. 7714050

[51] Int. Cl.³ ............................................. B62D 1/18
[52] U.S. Cl. .................................... 280/777; 188/371; 74/492
[58] Field of Search ................. 74/492, 493; 188/1 C; 248/548, 201; 280/777, 779, 780, 775; 180/90

[56] References Cited

U.S. PATENT DOCUMENTS

| | | | |
|---|---|---|---|
| 2,072,655 | 3/1937 | Tjaarda | 180/90 |
| 3,165,942 | 1/1965 | Steiner et al. | 74/493 |
| 3,282,622 | 11/1966 | Komenda | 180/90 |
| 3,470,761 | 10/1969 | Okamoto et al. | 188/1 C X |
| 3,483,768 | 12/1969 | Glass | 74/492 |
| 3,621,732 | 11/1971 | Kaniut | 74/492 |
| 3,678,778 | 7/1972 | Groves | 74/493 |
| 3,724,286 | 4/1973 | Kitzner et al. | 74/492 |
| 3,740,068 | 6/1973 | Arata | 74/493 X |
| 3,771,379 | 11/1973 | Rohrbach | 74/492 |
| 3,798,994 | 3/1974 | Hollins | 280/777 X |
| 3,822,608 | 7/1974 | Murase et al. | 74/493 |
| 3,868,864 | 3/1975 | Durkee et al. | 74/492 |

FOREIGN PATENT DOCUMENTS

| | | | |
|---|---|---|---|
| 1935746 | 3/1970 | Fed. Rep. of Germany . | |
| 2150789 | 5/1972 | Fed. Rep. of Germany . | |
| 2363895 | 7/1975 | Fed. Rep. of Germany . | |
| 2139995 | 1/1973 | France . | |
| 932027 | 7/1963 | United Kingdom | 74/492 |

Primary Examiner—C. J. Husar
Assistant Examiner—Moshe I. Cohen
Attorney, Agent, or Firm—Cushman, Darby & Cushman

[57] ABSTRACT

In a passenger car the steering wheel, which is impact-absorbing, is fixed to a steering wheel column that via an intermediate shaft is connected to a steering gear. The steering wheel column is journalled in a collapsible column support that is attached to a horizontal support beam extending transversely in the vehicle interior at a certain distance behind the beam supporting the windshield. The ends of the support beam are attached to carrying portions of the vehicle. On the intermediate shaft there is a deformable portion allowing the intermediate shaft to become deformed upon collision impact. In this way collision forces acting from the front reach the support beam and the steering wheel column late, while allowing the steering wheel and the column support to cushion the driver.

8 Claims, 2 Drawing Figures

STEERING EQUIPMENT ARRANGEMENT FOR MOTOR VEHICLES

The present invention relates to a personal injury prevention arrangement in motor vehicle steering equipment, comprising a steering wheel fixed to one end of a steering column which, in bearings allowing it to turn in a column support made with deformation initiation areas, is suspended in a transverse support member in the vehicle, said steering column being connected at its other end to a steering gear via an intermediate shaft.

It is previously known to design personal injury prevention arrangements in steering equipment for passenger cars by attaching the rear portion of the steering column to the windscreen beam and/or the cowl panel of the vehicle by means of a bracket structure. In the cases where the windscreen beam and the cowl panel are situated at a relatively large distance from the front of the vehicle, the known arrangements can be regarded as offering a satisfactory personal injury prevention effect since the car body has a relatively large compression length. As a rule, this means, however, that the total length of the vehicle and thereby its weight also increase, this design thus not being realizable on small or medium-size passenger cars with a demand for great manoeuverability, good fuel economy and otherwise low operating costs. In the latter kind of cars, the windscreen beam and the cowl panel are usually arranged considerably nearer the front of the vehicle than with larger cars, and this involves increased risk that said members, especially the cowl panel, are deformed in heavy frontal collisions. As a result, there is also increased risk for the steering wheel column to be given a relative movement backwards during such deformation, towards the interior of the vehicle, which puts the driver in great danger.

The steering equipment of modern passenger cars can in most cases be regarded as a compromise between a number of opposing demands.

The object of the present invention is to take these demands into consideration in a better way than previously, and to create a safer steering equipment arrangement where the windscreen beam and the cowl panel safely can be locked relatively close to the front of the vehicle.

According to the invention this is accomplished by a steering equipment arrangement where The support member comprises a separate, substantially horizontal support beam extending transversely in the forward portion of the vehicle interior;

said support beam is, at least at its ends, fixed in carrying portions of the vehicle;

the column support carrying the steering column is supported against a substantially vertical surface on the transverse support beam; and that the intermediate shaft is formed with at least one deformable portion which allows compression and/or deflection of the intermediate shaft for exceptional action by a force.

In the inventive arrangement, the transverse support beam is arranged to the rear of the windscreen beam and the cowl panel, whereby the support beam is not exposed to deformation forces in a head-on collision until the windscreen beam and the cowl panel are no longer capable of absorbing collision forces sufficiently.

On the other hand, the intermediate shaft is formed for yielding deformation on being acted upon by a relatively small collision force. As a result, collision forces acting from the front are prevented from being transferred to the steering wheel column suspended in the support beam. The column support constituting the steering wheel column suspension at the support beam is therefore dimensioned and made for optimum take-up of collision forces acting from the rear, e.g. those which occur when the driver is forced towards the steering wheel by inertia forces. Such reaction forces are taken up by a successively increasing deformation of the steering wheel and column support in response to the extent of the collision.

In an advantageous embodiment of the inventive arrangement the steering column is telescopically constructed. This means that the column can be made relatively long, enabling a firm suspension of the steering column, free from play and well insulated from vibrations, by the use of simple and cheap mountings. A comparatively long deformation length is ensured, which is of importance in heavy collisions, by the collapsibility of the steering wheel column, which can be constructed to absorb energy in a known way.

The column purpose is advantageously made as a jacket of perforated sheet, enclosing at least the rear portion of the steering wheel column. However, it has been found advantageous to provide a forward mounting for the column rigidly attached to the support beam via the column support. For this purpose, the forward portion of the column support is made as a closed sleeve without deformation initiation areas. The result of this is that the steering wheel column is protected from collision forces coming from the front, and that the column support in its entirety serves as protection for the turnable telescopic steering wheel column, as is the case with the conventional steering column tube in known structures. As opposed to the steering column tube, the column support is energy-absorbing and is an essential part of the inventive arrangement.

Further characterizing features of the invention are apparent from the appended claims.

Figure 2:
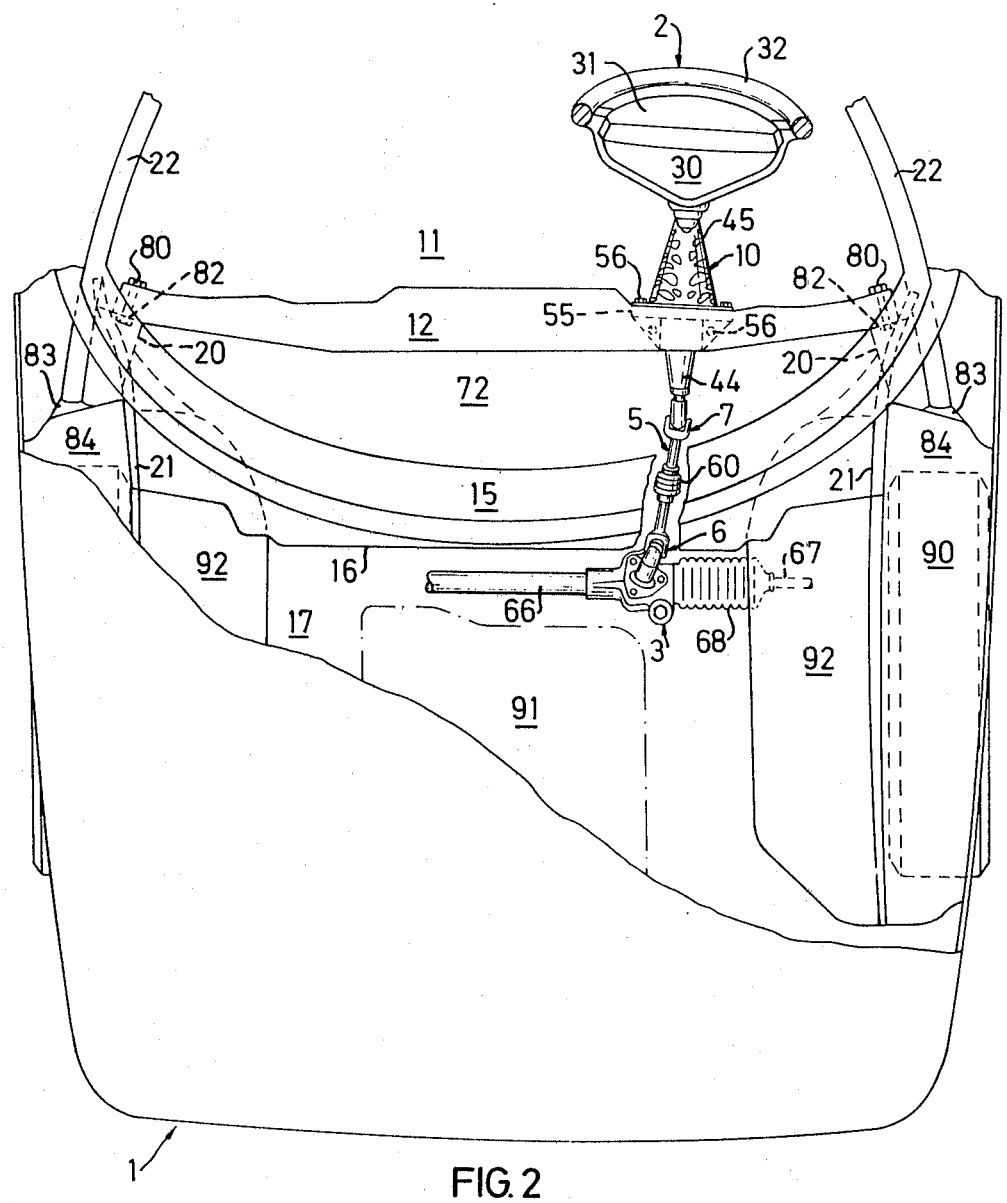

An embodiment exemplifying the invention will now be more closely described while referring to the appended drawing, where FIG. 1 is a side view of the inventive arrangement applied to a passenger car, and FIG. 2 is a view from above of the arrangement according to FIG. 1.

The inventive arrangement at a steering equipment of a motor vehicle 1 generally comprises a steering wheel 2 fixed to one end of a steering wheel column 4 rotatably suspended in a transverse support member fixed in the vehicle 1, the other end of the steering column 4 being connected to a steering gear 3 via a shaft 5 coupled therebetween by universal joints 6,7, this shaft being designated "intermediate shaft" hereinafter. The support member comprises a transverse, horizontal support beam 12 fixed in carrying portions of the vehicle 1. This beam is arranged in the forward portion of the interior 11 of the vehicle and is at a distance from a stiff beam 15 supporting the windscreen 14 of the vehicle 1, as well as at a distance from a cowl panel 16 separating the interior 11 of the vehicle from the engine compartment 17. At either end the support beam 12 is attached to a bracket 20, rigidly connected to a vertical side plate 21 arranged immediately in front of the forward corner post 22 of the vehicle 1, this post constituting a portion of the frame for a door opening in the side of the vehicle.

The steering wheel column 4 comprises two mutually nonrotatably coupled shaft portions 41,42 which allows telescopic collapse in an axial direction when exposed to an axial force. The column 4 is suspended in the support beam 12 by means of a column support 10, made with deformation initiation areas. In this respect, the column support 10 substantially comprises a forward and a rear jacket 44 and 45, respectively, and a bracket 55. The jackets 44,45 are each made as a truncated cone and the respective base ends face each other. The lower portions of the respective base ends are welded to each other, and the upper portions of the respective base ends are welded to the bracket 55, thus forming an assembled unit, the diameter of which is decreasing towards both ends. In the respective ends, the assembled column support 10 carries roller bearings 48,49 for mounting the forward and rear ends 46,47 of the column so that it can turn.

The connecting bracket 55 is made from heavy sheet bent to a shape conforming to that of the cross-section of the support beam 12. The column support 10 is attached to the support beam 12 by a number of bolts 56 going through the bracket 55, there being a number of spacers 57 to fix a certain space between the bracket 55 and the support beam 12. The forward jacket 44 of the column support 10 is made as a closed jacket and thereby constitutes a very strong structure. The rear jacket 45, on the other hand, is made from perforated sheet and is intended to serve as a deformation element to absorb axial force, for example, when a driver is forced against the steering wheel 2 as a result of a collision. Both forward and rear jackets 44,45 surround the steering column 4, which thus passes through and is protected in the column support 10, the lower defining line 58 of which being substantially parallel to the axial direction of the steering column 4.

A hub 24 conventionally carrying the steering wheel 2 is rigidly mounted to the rear end 47 of the steering column via a splines-type connection having so-called serrations, and a lock nut 26. The wheel 2 is provided with a shock-absorbing wheel cushion 30, the rearwardly facing impact surface 31 of which being situated in substantially the same plane as the wheel ring 32. The hub 24 is depressed so that the wheel cushion 30 can contain an upholstered deformation element 33 in the shape of a folded and slit sheet, said element 33 having the ability of decelerating a person colliding with the wheel 2, by means of impact-absorbing deformation. The wheel 2 and the wheel cushion 30 are so designed that said force absorption acts to a maximum before collision forces trigger deformation of the column support 10.

The intermediate shaft 5 is provided with a bellows 60 connecting two shaft halves 61,62 with each other. The bellows 60 is rigidly connected to each shaft half 61 and 62 and is designed and dimensioned for compression and/or deflection when exposed to a specified abnormal force. The rear shaft half 62 is torque-transmittingly connected to the forward end of the column 4 by means of the previously mentioned universal joint 7, and the forward shaft half 61 is taken through an opening 63 in the cowl panel 16 and is torque-transmittingly connected to the steering gear 3 by means of the previously mentioned universal joint 6. The opening is sealed by a rubber sleeve 64 carrying a sliding bearing bushing 65 enclosing the forward shaft half 61. The steering gear 3 is situated immediately in front of the cowl panel 16 and behind, as well as nearly below, a driving unit 91 for driving the front wheels 90 of the vehicle. The steering gear 3 is of the rack-and-pinion type, i.e. a pinion accompanying the turning movements of the wheel 2 gives longitudinal motion to a coacting rack (not shown). The rack runs in a rigidly mounted protecting tube 66, and the connection of the rack to a steering arm 67 for the respective wheel is protected by rubber gaiters 68.

Over the major portion of its length, the support beam 12 is made as a closed tubular structure through which, inter alia, air is intended to be led for heating and ventilating the interior of the vehicle. The tube structure is advantageously trapezium-shaped (two parallel sides) in cross-section with the longest side facing forward. The support beam 12 thus offers, from the point of view of safety, great resistance against forces acting from the front, and thereby prevents dangerous parts forcing their way into the interior of the vehicle in heavy collisions. This applies, for example, to parts in the heating and ventilation system of the vehicle 1, these being to a large extent accommodated in a space 72 between the support beam 12 and the cowl panel 16.

The respective ends of the support beam 12 are attached to the previously mentioned brackets 20 by means of strong, screwed joints 80. In FIG. 1 there are only shown the holes 81 in the brackets 20, intended for the screwed joint. Each bracket 20 is rigidly attached to a substantially vertical stiff side plate 21, integrated with and constituting a rearwardly directed continuation of an inner forward wheel housing plate 92. In horizontal section, the brackets 20 have a substantially triangular shape, with vertical engagement surfaces 82 for the ends of the support beam, these surfaces sloping inwardly relative to the vertical longitudinal symmetry plane of the vehicle 1. Said sloping engagement surfaces 82 and the somewhat forwardly curved shape of the transverse support beam 12 reduce the risk of the beam 12 being bent backwards into the vehicle interior 11 when subjected to a force from one side. The bracket 20 is also protected by the corner post 22 against such a force, the lower end of the post 22 being welded to a supporting attachment 83 on an outer wheel housing plate 84.

In a heavy head-on collision, the steering gear 30 is subjected to forces which are partially transferred to the intermediate shaft 5, to compress the bellows 60 incorporated in the intermediate shaft 5 and/or deflect the shaft 5. In this way, force transfer which can cause displacement of the steering wheel column 4 in the vehicle interior is avoided.

There is great risk during a head-on collision that the driver is forced into contact with the steering wheel 2 under the action of inertia forces. Such a movement is decelerated by the deformation element 33 in the wheel cushion 30 being deformed while absorbing force. Continued pressure against the steering wheel 2 results in the deformation of the jacket 45 of the column support 10, simultaneously as the column 4 begins to telescopically collapse. The force absorption which takes place in the way described above takes place in the steering wheel 2, wheel cushion 30, column support 10, jacket 45 and steering column 4 is designed to prevent or at least reduce personal injuries in a head-on collision to a greater extent than previously.

During a heavy head-on collision, there is risk that the driving unit 91 is forced backwards into contact with the cowl panel 16. In a majority of cases this results in a force-absorbing deformation of the cowl panel 16 and in forcing it backwards against the support beam 12 simultaneously as the windscreen beam 15 can also be subjected to deformation while absorbing force. With this aspect in mind, the forward jacket 44 of the column support 10 and the support beam 12 with its attachment are made so that, in combination with the deformation means mentioned above, they optimally utilize the energy absorption capability of the vehicle and prevent the steering column 4 from moving backwards into the vehicle interior 11.

The chief object of the invention is to ensure safety with respect to personal injuries in accidents, but in addition the inventive arrangement, including the attachment of the support beam 12 in the vehicle 1, signifies simplified handling with respect to vehicle assembly. The steering wheel column 4 and the column support 10 can namely be sub-assembled on the support beam 12 before assembly in the vehicle 1, and instrument panel and details in the heating and ventilation system of the vehicle can be attached to the support beam during such sub-assembly. Such an arrangement facilitates final assembly of the vehicle and also enables simplified service work.

The arrangement can be modified in alternative embodiments within the purview of the inventive concept. Thus, the steering column can be made shorter and without telescopic shaft parts, whereby an intermediate shaft connected to the column needs to be longer. In such cases, the steering column is suitably provided with at least one fracture zone. Neither is it necessary to design the intermediate shaft in accordance with the embodiment described, and the intermediate shaft can alternatively be made with one or more fracture zones. It is further possible to attach the support beam to brackets or similar means rigidly attached to the end portions of the windscreen beam and/or with respective forward corner posts in the vehicle.

What we claim is:

1. A safety steering arrangement for a motor vehicle comprising a steering wheel; a steering column fixed to the steering wheel; an intermediate shaft connecting said steering column with a steering gear and having a deformable portion, which allows compression and/or deflecton of the intermediate shaft under the action of an exceptional impact force from the steering gear side of the intermediate shaft; a column support carrying the steering column and having deformation initiation areas, a vehicle windscreen beam; a cowl panel; a support beam extending substantially horizontally and transversely at a location rearwardly of and separate from the vehicle windscreen beam and cowl panel and fixed in carrying portions of the vehicle body sides, said support beam being positioned in front of said deformation initiation areas of said column support and having a surface facing the steering wheel and supporting the column support when said deformation areas are deformed under the action of an exceptional impact force from the steering wheel side of the steering column.

2. An arrangement as claimed in claim 1, wherein the column support comprises a truncated cone of perforated sheet surrounding the rear portion of the steering column and being rigidly connected to the support beam.

3. An arrangement as claimed in claim 2, wherein the column support comprises a closed tapering jacket surrounding the forward portion of the steering column and being rigidly connected to the support beam.

4. An arrangement as claimed in claim 3, wherein said truncated cone and tapering jacket have their respective base ends rigidly connected to each other and to a bracket having a suitable cross-section, to form a unit which is connected to the support beam via the bracket, and which by means of roller bearings in its respective ends constitutes a mounting in which the steering column can turn.

5. An arrangement as claimed in claim 4, wherein the support beam is removably attached to laterally placed brackets in the forward portion of the vehicle interior, said brackets being rigidly connected to carrying portions of the vehicle.

6. An arrangement as claimed in claim 1, wherein the intermediate shaft is connected to the steering column and the steering gear by means of universal joints and is provided with a bellows connecting two intermediate shaft portions fixed to the respective universal joint with each other and constituting means allowing compression and/or deflection of the intermediate shaft under the action of an exceptional impact force from the steering gear side of the shaft.

7. An arrangement as claimed in claim 1 wherein the steering column comprises two telescopically connected shaft portions.

8. In a motor vehicle having a passenger compartment terminating at its forward end in a transverse cowl panel, a windscreen and a transverse windscreen beam supporting the windscreen from below: a safety steering arrangement comprising: a rotatable steering column assembly having a rear portion supporting a steering wheel and having a front portion passing through said cowl panel and connected to a steering gear, said front portion including a section which allows compression and/or deflection under the action of an exceptional impact force and said rear portion including a telescopic portion to allow telescopic collapse in an axial direction when exposed to an axial force; a fixed support beam separate from said cowl panel and from said windscreen beam, said fixed support beam being disposed rearwardly of said cowl panel and of said windscreen beam and extending substantially transversely and horizontally; a steering column support having deformation initiation areas; means connecting said support to said fixed support beam, said support extending rearwardly of said connection and rearwardly of said support beam and supporting said steering column at a location rearwardly of said connection and said beam.

* * * * *